No. 672,664. Patented Apr. 23, 1901.
J. BORNEMANN.
MACHINE FOR MANUFACTURING BALLS OR OTHER BODIES.
(Application filed June 2, 1900.)

(No Model.)

WITNESSES:
E. Wolff
Chas. E. Pensyen

INVENTOR
Joseph Bornemann.
BY
Hauff + Hauff
ATTORNEYS

UNITED STATES PATENT OFFICE.

JOSEPH BORNEMANN, OF NEW YORK, N. Y., ASSIGNOR OF ONE-HALF TO ADOLF MANDEL, OF SAME PLACE.

MACHINE FOR MANUFACTURING BALLS OR OTHER BODIES.

SPECIFICATION forming part of Letters Patent No. 672,664, dated April 23, 1901.

Application filed June 2, 1900. Serial No. 18,854. (No model.)

*To all whom it may concern:*

Be it known that I, JOSEPH BORNEMANN, a subject of the Emperor of Germany, residing at borough of Manhattan, in the city, county, and State of New York, have invented new and useful Improvements in Machines for Manufacturing Balls or other Bodies, of which the following is a specification.

By means of this invention such articles as the antifriction balls or spheres used for ball-bearings in machinery, vehicles, and elsewhere can be readily produced, as set forth in the following specification and claims and illustrated in the annexed drawings, in which—

Figure 1:
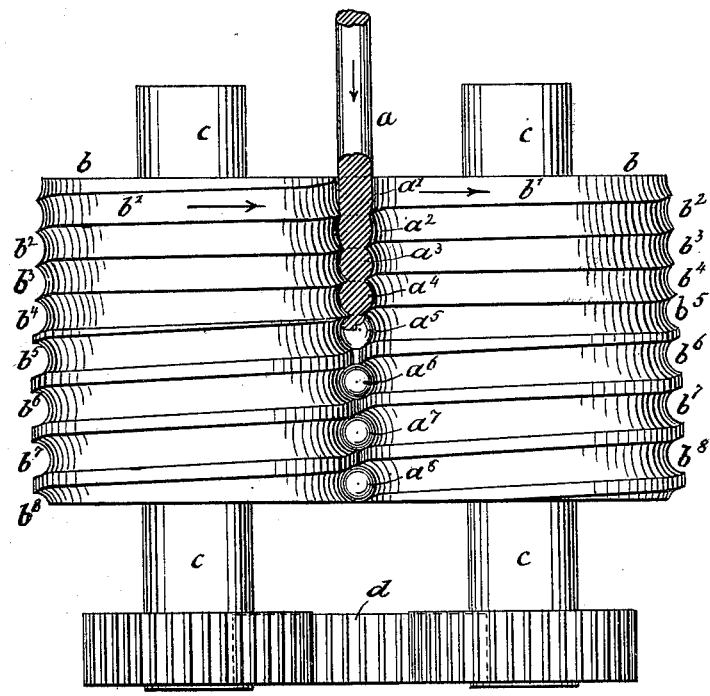
Figure 2:
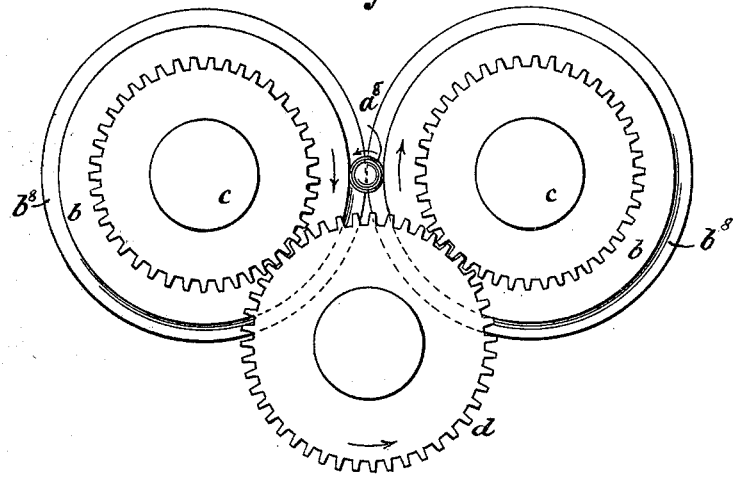

Figure 1 is a front elevation of a machine or apparatus for forming balls, the forming-rolls being in their normal vertical position. Fig. 2 is a view looking at the under side of Fig. 1.

In forming balls or convex bodies a blank or piece of material such as a rod or wire $a$ is formed or pressed into what may be called "beaded shape," the beads being indicated from $a'$ to $a^5$. These beads are then separated or sheared or torn apart, as indicated by the space between beads $a^5$ and $a^6$ or between succeeding beads. The separated beads being formed into spheres or balls, as indicated at $a^8$, the manufacture or shaping is completed. As seen, the beads $a'$ to $a^8$ are of gradually-increasing convexity, the bead $a^2$ being more convex or approaching nearer to spherical than bead $a'$, and so on. This operation, as seen, can be performed by the device illustrated. The rollers or, as they might be called, "dies" $b$ are made to convex, shape, or bead the blank $a$ and to separate and sphere the beads or form the latter into balls $a^8$. The dies $b$ have grooves or channels of varying depth or concavity. Groove $b'$ is flatter or less concave than groove $b^2$, and so on, groove $b^8$, for example, forming a semicircle when sectioned or cut by a plane in the axis of the die. Said grooves are also made to vary in pitch. A practical arrangement has been found to have a number of grooves—as, for example, from $b'$ to $b^4$—of one pitch and to increase or heighten the pitch from $b^5$ on. At $b'$ the dies or rollers $b$ are spaced or of such diameter that the rod or blank $a$ can be inserted or placed between the rollers. The rollers gradually approach one another or increase in diameter, and in the example shown the high parts between screw-threads or grooves $b^7$ and $b^8$ of the respective rollers are in touch.

The rollers $b$ or their axles $c$ are rotated or driven in suitable manner—as, for example, by a driving-gear $d$, which causes the rollers to rotate in the same direction.

Of course in speaking of balls it is not meant that the machine must necessarily be confined to the manufacture of such convex bodies, since by suitably shaping the grooves $b'$ to $b^8$ it might be possible to produce bodies of other shape, as oblong or disk-shaped or other forms—such, for example, as so-called "bead-wire" or "ball-chain."

What I claim as new, and desire to secure by Letters Patent, is—

1. In a machine of the character described, the combination of rolls or dies, each having two series of peripheral concaved grooves, one series of a common pitch and the other series of a successively heightened or increased pitch, substantially as set forth.

2. In a machine of the character described, the combination of rolls or dies, each having two series of peripheral concaved grooves gradually varying in depth, one series having a common pitch and the other series having a successively heightened or increased pitch, substantially as described.

In testimony whereof I have hereunto set my hand in the presence of two subscribing witnesses.

JOSEPH BORNEMANN.

Witnesses:
W. C. HAUFF,
E. F. KASTENHUBER.